(12) United States Patent
Hebel et al.

(10) Patent No.: US 6,826,034 B2
(45) Date of Patent: Nov. 30, 2004

(54) VIBRATION-RESISTANT ELECTROCHEMICAL CELL, AND METHOD FOR THE PRODUCTION THEREOF

(75) Inventors: Rainer Hebel, Heidenheim (DE); Rudolf Wittman, Heidenheim (DE); Norbert Will, Heidenheim (DE)

(73) Assignee: EPCOS AG, Munich (GB)

( * ) Notice: Subject to any disclaimer, the term of this patent is extended or adjusted under 35 U.S.C. 154(b) by 0 days.

(21) Appl. No.: 10/701,362

(22) Filed: Nov. 4, 2003

(65) Prior Publication Data
US 2004/0130854 A1 Jul. 8, 2004

(30) Foreign Application Priority Data
Nov. 4, 2002 (DE) .......................................... 102 51 230

(51) Int. Cl.[7] ................................................ H01G 2/10
(52) U.S. Cl. ..................... 361/517; 361/535; 361/301.4
(58) Field of Search .......................... 361/301.1, 301.3, 361/301.4, 517–519, 535–537; 29/25.41, 25.42

(56) References Cited

U.S. PATENT DOCUMENTS

| | | |
|---|---|---|
| 3,509,427 A | 4/1970 | Ruscetta |
| 4,546,415 A | 10/1985 | Kent et al. |
| 4,987,518 A | 1/1991 | Dain |
| 5,847,919 A * | 12/1998 | Shimizu et al. .............. 361/517 |
| 6,236,146 B1 | 5/2001 | Cramer et al. |
| 6,310,756 B1 * | 10/2001 | Miura et al. .............. 361/301.3 |
| 6,310,764 B1 | 10/2001 | Will et al. |
| 6,400,555 B2 * | 6/2002 | Miettinen et al. ........... 361/517 |
| 2003/0089879 A1 | 5/2003 | Ebel et al. |

FOREIGN PATENT DOCUMENTS

| | | |
|---|---|---|
| DE | 1925 508 | 5/1969 |
| DE | 7230947 | 8/1972 |
| DE | 7230947 | 3/1973 |
| DE | 19929598 | 1/2001 |
| DE | 100 16 866 | 11/2001 |
| JP | 10-022177 | 1/1998 |
| WO | WO0178095 | 11/2001 |

* cited by examiner

*Primary Examiner*—Anthony Dinkins
(74) *Attorney, Agent, or Firm*—Fish & Richardson P.C.

(57) ABSTRACT

An electrochemical cell includes an electrode stack and a housing that is substantially cylindrical in shape and that holds the electrode stack. The housing has an indentation that forms a substantially flat contact area with the electrode stack. A method for producing the electrochemical cell includes inserting the electrode stack into the housing, bringing a die into contact with the housing, the die having a head with at least three contact points that come into contact with the housing, and stamping the die onto the housing to form the indentation.

16 Claims, 5 Drawing Sheets

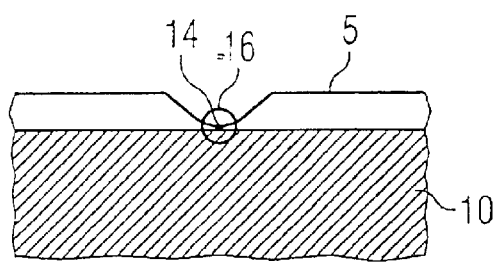
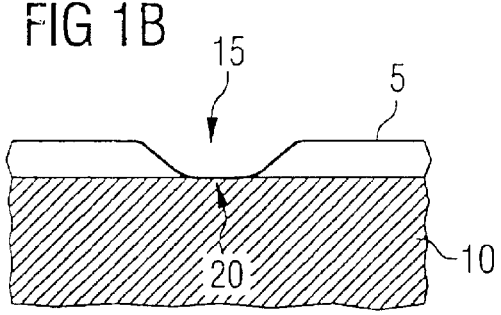
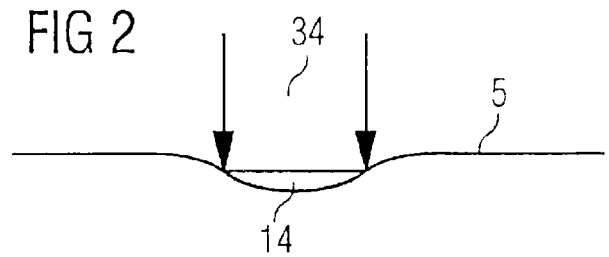
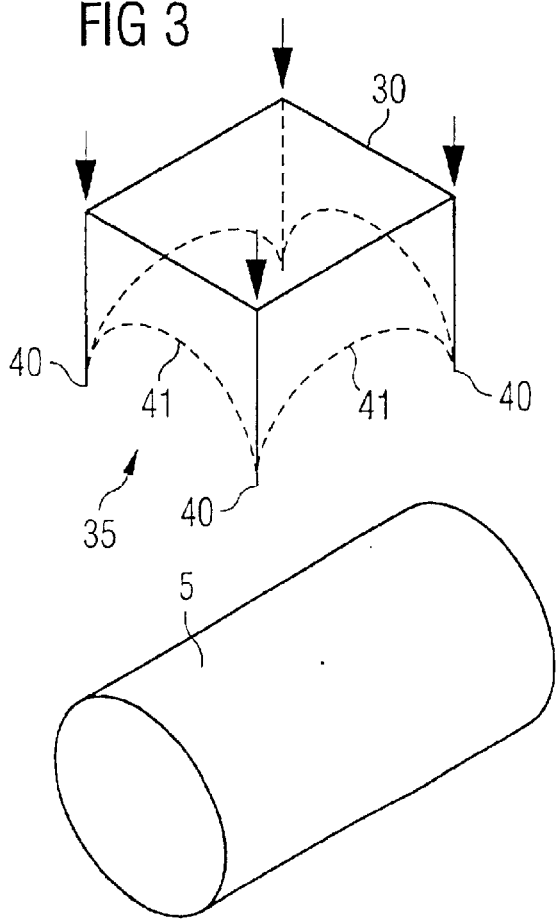

FIG 6A
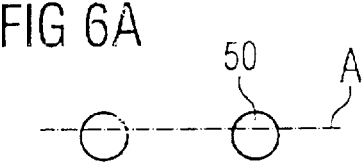
FIG 6B
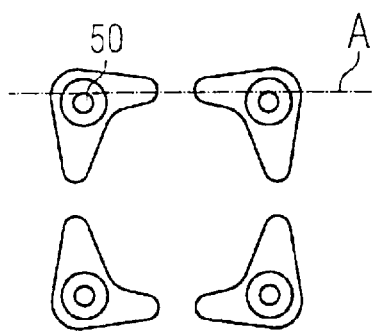
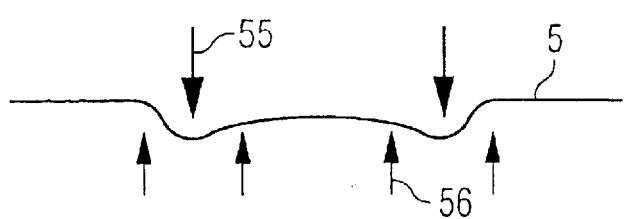
FIG 6C
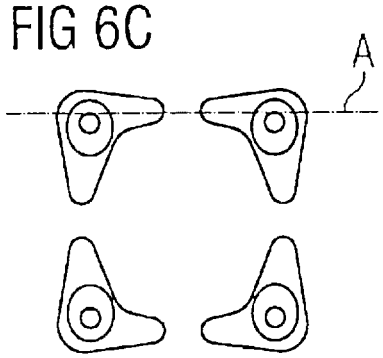
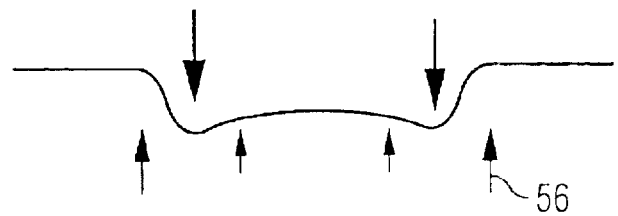
FIG 6D
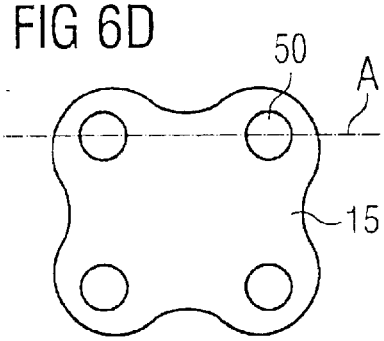
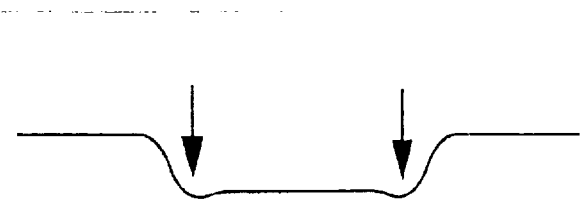

VIBRATION-RESISTANT ELECTROCHEMICAL CELL, AND METHOD FOR THE PRODUCTION THEREOF

CROSS-REFERENCE TO RELATED APPLICATION

This patent application claims priority to German Patent Application No. 10251230.2, which was filed on Nov. 4, 2002, the contents of which are hereby incorporated by reference into this application as if set forth herein in full.

BACKGROUND

Many electrochemical cells, such as capacitors, batteries or rechargeable batteries, have a housing in the form of a cup (i.e., a cup-shaped, or substantially cylindrical, housing) that accommodates (i.e., holds) an electrode stack. The electrode stack generally comprises flat positive and negative electrodes that can be separated from one another via, e.g., a separator layer. The electrodes, in this example, make contact with an electrolyte. In the case of electrolytic capacitors, such as aluminium electrolytic capacitors, the electrodes frequently comprise an aluminium cathode film and an anode film comprised of aluminium with a dielectric oxide layer. A spacer is located between the films. The spacer may be a single layer or a multiple layer comprised of paper that is impregnated with an electrolyte solution. The arrangement is normally implemented as a winding that is applied around a mandrel and that is introduced into the cup-shaped housing. A cover, on which electrical connections are arranged, is frequently used to close the top of the cup-shaped housing. In this case, and particularly in the case of electrolytic capacitors, the connections can be electrically conductive connections to the capacitor winding.

Electrochemical cells, such as those described above, are frequently used in automotive applications, such as automobiles. There, these cells are subject to very severe mechanical vibrations. If the vibration loads are severe enough, the electrode stack may move relative to the cup-shaped housing. As a result, it is possible for the electrodes of the electrode stack to be damaged, or for the electrical connections between the electrode stack and the electrical connections which are fitted on the outside of the housing to become loose or to be damaged.

An electrolytic capacitor having a high vibration load capacity is known from Laid-Open Specification DE 199 29 598 A1. This electrolytic capacitor has connecting strips between the capacitor winding and the two electrical connections. The connecting strips absorb the majority of the forces which place a load on the capacitor winding when the entire capacitor is subject to vibration. In addition, the capacitor winding may also be fixed in the housing by so-called center beads with a cross section, which tapers into the interior of the housing being fitted. The center beads make contact with the capacitor winding. However, these center beads have a linear contact area with the capacitor winding. Beads such as these do not adequately fix the capacitor winding to the cup-shaped housing, necessitating use of the connecting strips mentioned above.

SUMMARY

The object of the present invention is thus to provide a vibration-resistant electrochemical cell, which can be produced particularly easily, together with a method for producing the electrochemical cell, which avoids the disadvantages mentioned above.

According to the invention, this object is achieved by an electrochemical cell according to claim 1. Further advantageous embodiments of the cell and production method are the subject matter of further claims.

An electrochemical cell according to the invention includes a cup-shaped housing that accommodates an electrode stack. At least one indentation is provided in the center housing. The indentation fixes (i.e., holds) the electrode stack in the housing. A two-dimensional, flat contact area is, in this case, formed between the indentation and the electrode stack.

Since, in the invention, there is a flat contact area between the indentation and the electrode stack, a particularly large contact area can be produced, which can fix the electrode stack in the housing particularly well and reliably. Conventional indentations in housings of electrochemical cells have a cross section, such as a round cross section, which tapers into the interior of the housing, and which allows only a linear contact area between the indentation and the electrode stack. Thus, housings with conventional indentations are not able to fix an electrode stack reliably when subject to high vibration loads.

A further advantage of an electrochemical cell according to the invention is that the large contact area between the housing and the electrode stack allows better thermal contact to be established. An alternating current load frequently results in heat in the electrode stack, particularly in the capacitor winding of capacitors. Such heat can be dissipated better to the housing and from there to the environment via the particularly large contact area with the housing.

Advantageously, the at least one indentation is formed in side walls of the cup-shaped housing. Also advantageously, there are areas at the edge of the indentation, which are indented more deeply into the interior of the housing than other areas of the indentation. This enables pressure forces to be distributed more uniformly over the electrode stack and, as a result, ensures that the electrode stack is not pinched severely.

It is advantageous for at least three more deeply indented areas to be provided in the indentation. The three more deeply indented areas may represent, e.g., the boundary points in a particularly simple manner for an area in which a flat indentation according to the invention can be produced in a housing.

In order to ensure that the electrode stack is fixed particularly well in the housing, the indentation in the housing advantageously extends over the majority of the height of the electrode stack.

It is also possible that two or more indentations are provided in the housing of the electrochemical cell, which are formed either in the lower area or in the upper area of the electrode stack in the housing. The use of indentations for alternate fixing in the upper and lower areas of the electrode stack likewise makes it possible to ensure that this electrode stack is fixed particularly reliably.

The electrode stack may, in this case, have at least two electrode layers, which are separated from one another by a separator layer. If the electrochemical cell is in the form of an aluminium electrolytic capacitor, then the electrode stack may be a capacitor winding which surrounds two aluminium films as electrodes, which are separated from one another by a separator and make contact with an electrolyte. The anode film may, in this case, have a dielectric oxide, such as aluminium oxide. The separator layer may be comprised of, e.g., one or more layers of paper, which are impregnated with an electrolyte.

One method for producing an electrochemical cell according to the invention comprises the following steps: In a first method step (A), an electrode stack is inserted into a cup-shaped housing. Then, in a method step (B), an indentation with a flat contact area with the electrode stack is formed via a die having a die head. There are at least three contact points provided on the die head which make point contacts with the housing, and in the process fix (i.e., hold) the electrode stack to the housing.

At least three contact points are necessary in order to define the corner points of a flat area in which an indentation is formed in the housing.

A die whose die head is formed such that it forms only point and linear contact areas with the housing during production of the indentation is advantageously used in method step (B). This type of die allows the indentations to be produced particularly well with a two-dimensional, flat contact area with the electrode stack in cup-shaped housings. At the start of the stamping process, the die head makes contact with the housing only via the at least three contact points. As the die head penetrates further into the housing, this results in the housing making contact with edges of the die head that are located between the contact points. The contact areas between the edges of the die head and the housing are linear in this case. This special shape of the die head makes it possible to prevent the conventional outward bulges with a rounded cross section particularly well, which can be produced when using conventional dies (see, for example, FIG. 2).

A die is used in method step (B) in which the surface of the die head has a concave curvature, and in which the edges of the die head located between the contact points are curved such that their distance from the housing increases as the distance from the contact points increases. The edges, in each case, have a distance from the housing that is greater at approximately a center between the contact points. A die head which is shaped in this manner enables point and line contact areas with the cup-shaped housing to be formed particularly well (see, for example, FIGS. 3 and 4B). As already mentioned above, at the start of the stamping process, only point contact areas exist between the contact points of the die head and the cup-shaped housing. As the die head penetrates further into the housing during the stamping process, curved linear contact areas are also formed via the edges between the contact points. Advantageously, this allows indentations with flat contact areas to be formed adjacent the electrode stack at the end of the stamping process, as a function of the distance between the contact points and the height and the thickness of the cup-shaped housing (see, for example, FIGS. 6A to 6D).

Advantageously, as a result of the linear contact areas between the edges of the die head and the housing, elongated indentations can be produced using the dies noted above. In this case, long sides of the indentations are produced particularly easily and reliably via the linear contact areas (see, for example, FIGS. 6A to 6D).

Indentations with smaller areas can also be produced via dies which form only point contact areas with the housing throughout the entire stamping process (see, for example, FIGS. 4A and 5A b to 5E).

The dies used may be, for example, dies with a polygonal cross section, with contact points that protrude (as projections) from the surface of the die head representing the corners of the polygon. In this case, the expression "polygonal cross section" means the projection of the plan view of the die head onto a plane.

The polygonal cross section of the die may, for example, be rectangular, in which case there is then a contact point at each of the four corners of the die head.

In method step (B), it is also possible for an indentation to be formed such that there are areas at the edge of the indentation which are indented more deeply than the rest of the indentation. These areas of deeper indentation, in this case, represent those areas of the housing which make contact with the contact points on the die head at the start of the stamping process (production of the indentation). Indentations such as these frequently do not have a surface with a planar cross section, but have a surface which is curved in a slightly convex shape outwards in areas which are not associated with the edges (see, for example, FIG. 9). Advantageously, indentations such as these can distribute pressure particularly well over the electrode stack, while at the same time fixing (i.e., holding) the electrode stack particularly reliably in the housing.

The material of the housing is advantageously a ductile material, in which the desired indentations can be produced particularly easily by means of the dies mentioned above. In this case, it is particularly advantageous to use metals, such as aluminium, as the material used to produce the cup-shaped housing.

The electrochemical cell according to the invention, and a method for producing the electromechanical cell, will be explained in more detail in the following text with reference to exemplary embodiments and figures.

Other features and advantages will be apparent from the description, the drawings, and the claims.

DESCRIPTION OF THE DRAWINGS

FIG. 1A shows a conventional indentation.

FIG. 1B shows an indentation according to the invention.

FIG. 2 shows the production of a conventional indentation via a conventional die.

FIG. 3 shows a die with a specially shaped die head above a cup-shaped housing, which are used to produce the indentations according to the invention.

FIGS. 6A to 6D show plan views and cross sections of a further variant of a method according to the invention for producing an indentation.

Like reference numerals in different figures indicate like elements.

DETAILED DESCRIPTION

Figure 4A:
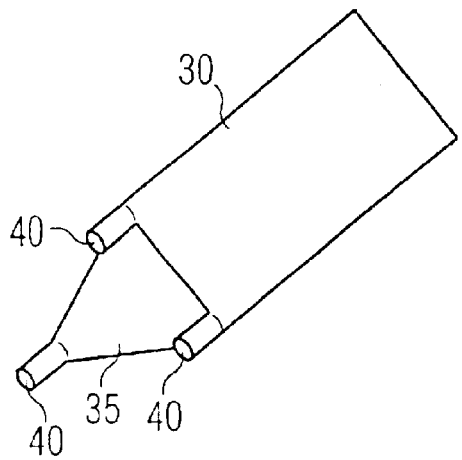
FIGS. 4A and 4B show different embodiments of dies with specially shaped die heads, which are used to produce the indentations according to the invention.

FIG. 1A shows a cross section of a conventional indentation 14 with a cross section that tapers into the interior of a housing. The indentation 14 is formed in the housing 5, in which case only one point or linear contact area 16 with the electrode stack 10 is formed with elongated indentations. For this reason, the electrode stack cannot be fixed satisfactorily in the housing via a conventional indentation.

FIG. 1B shows a cross section of an indentation 15 according to the invention in the wall of a housing 5, with a two-dimensional flat contact area 20 with an electrode stack 10. The large contact area means that the electrode stack can be fixed particularly well via these indentations.

FIG. 2 shows a cross section of the production of a conventional indentation 14 via a conventional die 34, whose die head has a planar surface. Since the contact surface between the die head and the housing 5 is flat, this results in a V-shaped or U-shaped indentation. In a corresponding manner, only a contact line in the form of a maximum line can be formed with the electrode stack.

FIG. 3 shows a perspective view of a die 30 for producing indentations according to the invention in the outer surface of an elongated cup-shaped housing 5. In this case, the die has a rectangular cross section, and contact points 40 which project at the corners of the cross section are revealed. The edges 41 run between each of the adjacent contact points and are curved such that the distance between the edges and the housing increases as the distance from the contact points 40 increases, with the edges in each case being at the greatest distance from the housing approximately in the center between the contact points, thus resulting in a curved edge profile. The surface of the die head is, in this case, curved inwards in a concave shape, with the center of the die head being at the greatest distance from the cup-shaped housing.

A die with a die head such as this has only four point contact areas with the cup-shaped housing 5 at the start of the stamping process. These contact areas are produced by the housing touching the contact points 40. As the die head penetrates further into the cup-shaped housing, which already contains the electrode stack, line contact areas can also be formed between the die and the housing via the curved edges 41 of the die (see, for example, FIGS. 6A to 6D).

FIG. 4A shows a perspective view of one example of a die 30 with a die head for producing indentations according to the invention. This shows a die with a triangular cross section, with the corners of the triangle each having contact points 40 in the form of pins. The surface of the die head 35 is planar in this case. A die such as this may be used for producing relatively small indentations, which are not particularly elongated, with only point contact areas with the housing being formed throughout the entire stamping process (see FIGS. 5A to 5E).

Figure 4B:
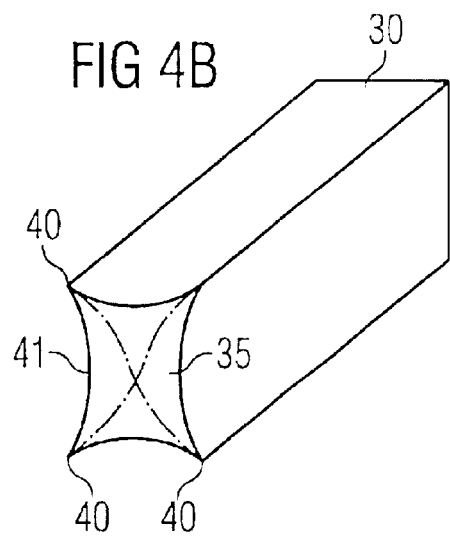

FIG. 4B shows a perspective view of a die 30 whose die head surface 35 is curved inwards in a concave shape. At the same time, four corner points are defined, at which there are four protruding contact points 40. The edges 41 between adjacent contact points are curved in this case, such that their distance from the housing increases as the distance from the contact point increases. A die such as this has only four point contact areas with the cup-shaped housing, via the contact points 40, at the start of the stamping process. As the stamping process progresses, line contact areas are also formed between the edges 41 of the die head and the cup-shaped housing. A die such as this also allows elongated indentations to be produced particularly easily, with flat contact areas with the electrode stack (see, for example, FIG. 7).

FIGS. 5A to 5E show a stamping process for producing an indentation according to the invention via a die which forms only four point contact areas with the cup-shaped housing throughout the entire stamping process. The indentation 50 in the housing are shown as height lines in the plan view on the left-hand side of each of the figures. The cross sections through the areas annotated A on the left-hand side are shown on the right-hand side of each of the figures.

Figure 5A:
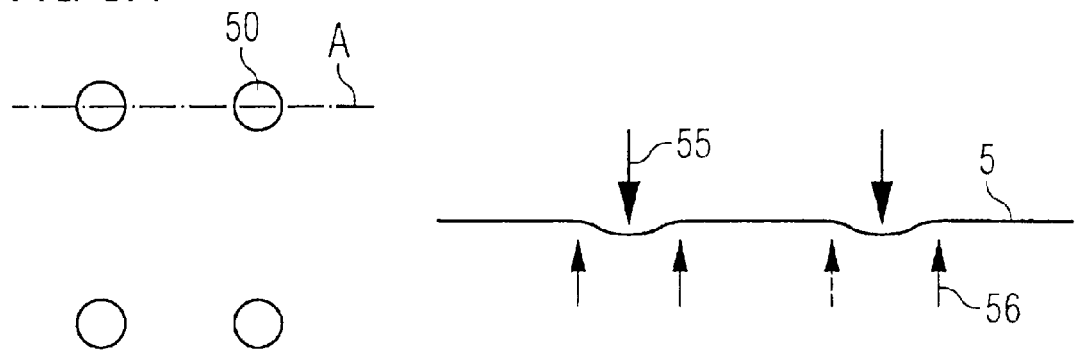
FIGS. 5A to 5E show plan views and cross sections of the profile of a method according to the invention for producing an indentation.

FIG. 5A in this case shows the stamping process immediately after it starts. In this case, four point indentations 50 are formed in the housing. In the right-hand cross-section drawing, 55 denotes the direction of the stamping process, with the arrows 56 indicating the stress forces in the material of the cup-shaped housing 5, which counteract the stamping process. At the start of the stamping process, there are still relatively large stress forces 56 in the cup-shaped housing, in this case.

Figure 5B:
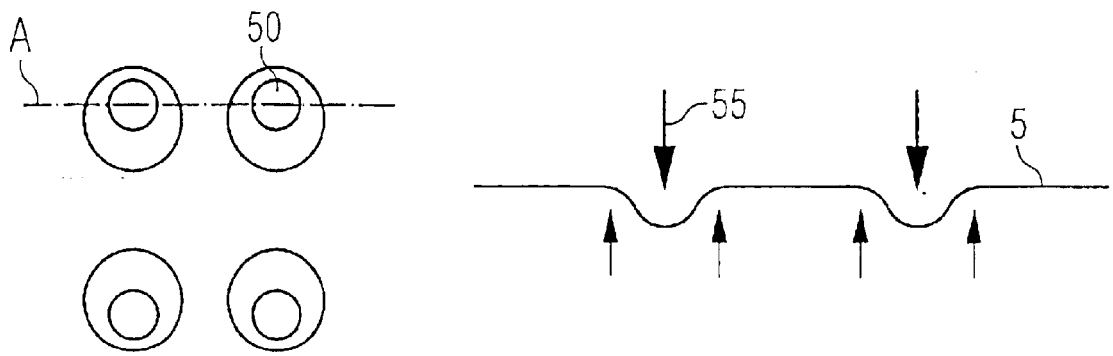

FIG. 5B shows the situation once the die head has penetrated further into the cup-shaped housing. The indentations 50 have in this case been enlarged, as indicated by the height lines.

Figure 5C:
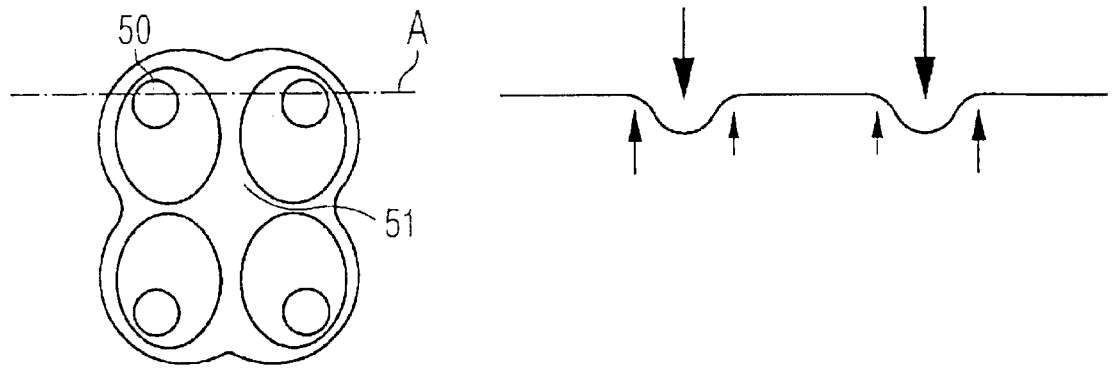

FIG. 5C shows the height lines once the die head has penetrated further. This shows that the previous four individual indentations 50 have, in the meantime, been combined to form a single large indentation 51. This is due to the fact that, as shown in the cross section, the stress forces in the material of the housing 5 which counteract the stamping process become increasingly weaker as the die head penetrates further, so that those areas of the housing which are located between the point indentations 50 are also indented (weaker stress forces indicated schematically by smaller arrows 56). The original indentations 50 now represent only the corner points which cover the area of the large indentation 51.

Figure 5D:
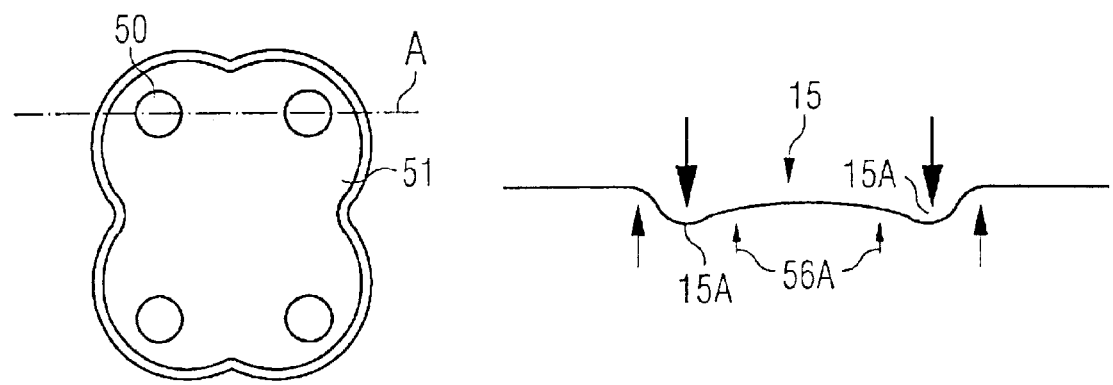
Figure 5E:
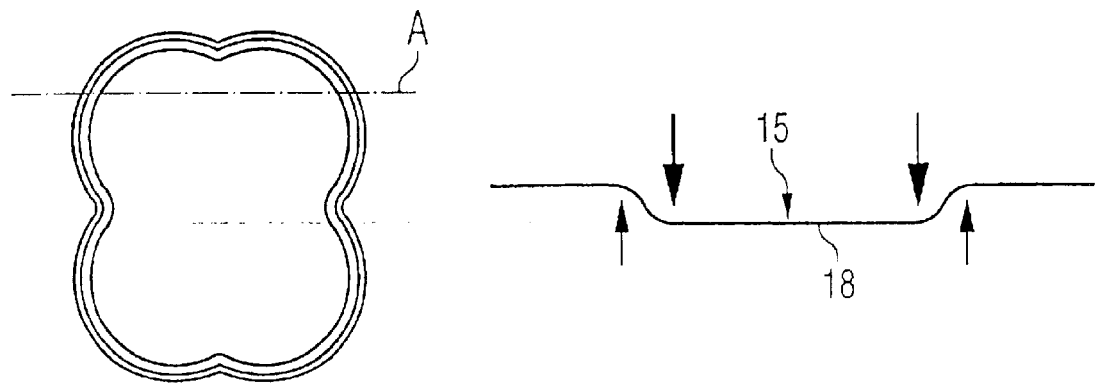

FIGS. 5D and 5E show the rest of the stamping process, with the stress forces in the cup-shaped housing which counteract the stamping process becoming increasingly weaker (smaller arrows 56A in FIG. 5D, and no more arrows in FIG. 5E). An indentation is formed to an increasing extent during this process, and its surface 18 which makes contact with the capacitor winding becomes increasingly planar. The right-hand side of FIG. 5D shows the positions of the original contact-making points 50 that are still present on the areas 15A which are indented more deeply.

FIGS. 6A to 6D show the formation of an elongated outward bulge, with not only point contact areas but also line contact areas being formed between the die head and the housing during the stamping process. The die, which is illustrated in FIG. 4B, may be used, for example, for this purpose. The left-hand side of FIG. 6A once again shows the plan view of the indentations in the form of height lines, with the respective cross section through the area annotated A in the left-hand figure being shown on the right-hand side. At the start of the stamping process (FIG. 6A), there are four point indentations 50 which are produced, for example, by the contact points 40 of the die, which is shown in FIG. 4B, penetrating into the housing. As the die head penetrates further into the housing, this also results in line contacts being formed between the edges 41 of the die head and the housing.

FIG. 6B in this case shows indentations 50, whose plan view is similar to an L or an inverted L. In this case, as before, there are stress forces 56 in the material of the housing 5 in the opposite direction to the stamping direction 55. Indentations 50 of this type are produced by the line contact areas with the edges 41 of the die.

As is shown in FIGS. 6C and 6D, these stress forces become smaller as the die head penetrates further into the housing (smaller arrows 56 in FIG. 6C, and no more arrows in FIG. 6D), so that the L-shaped indentations are joined together to form a single large indentation 15 (see FIG. 6D). The original indentations 50 now represent the corner points of the large indentation 15.

Figure 7:
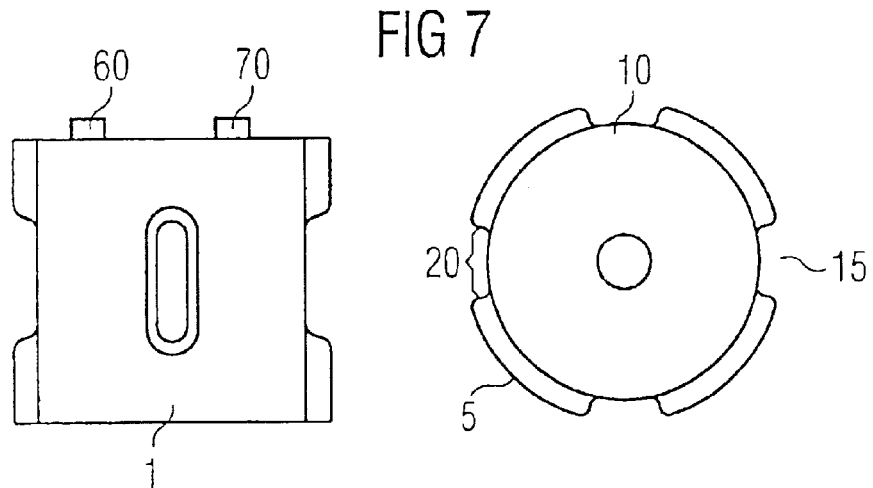
FIGS. 7 to 9 show variants of capacitors according to the invention, with indentations, as cross sections and side views.

FIG. 7 shows a capacitor according to the invention with electrical connections 60 and 70, in the form of a side view and cross section. In this case, indentations 15 according to the invention are formed, and have a flat contact area 20 with the capacitor winding 10. In this case, there may be two or more indentations 15, which, in this case, are particularly elongated and extend over the majority of the direction in which the capacitor winding 10 extends, thus resulting in particularly good fixing.

Figure 8:
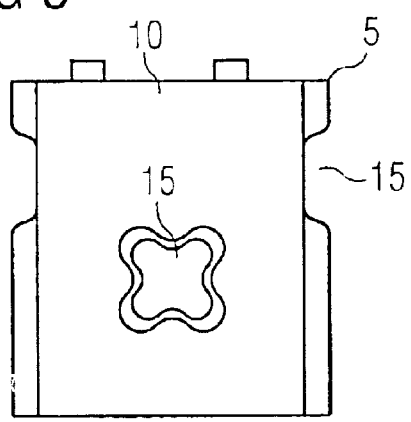

FIG. 8 shows a side view of a capacitor according to the invention, with the indentations 15 in each case being produced both in the lower and in the upper areas of the capacitor winding 10. This results in particularly good fixing over the entire length of the capacitor winding.

Figure 9:
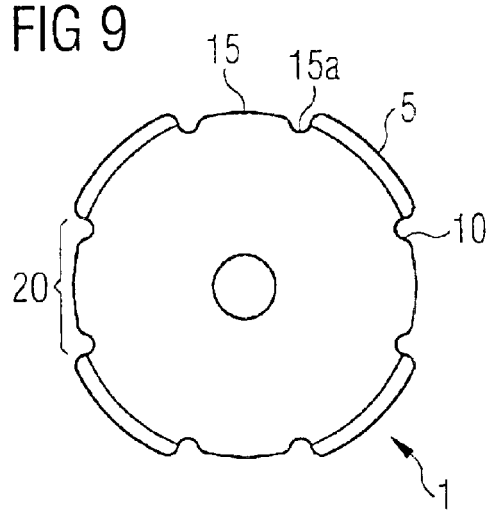

FIG. 9 shows a cross section through a further embodiment of a capacitor according to the invention. As can be seen, the indentations 15 according to the invention in the housing 5 have areas 15A at the edge which are indented more deeply than the rest of the indentation 15. This can be achieved, for example, by the die head not penetrating quite as deeply into the cup-shaped housing, so that the original contact points can still be identified (see, for example, the cross section in FIG. 5D). In this case, areas of these indentations which are not associated with the edge are curved outwards, so that the pressure is distributed particularly uniformly over the capacitor winding and, in the process, the winding is not pinched so severely.

The invention is not restricted to the exemplary embodiments and examples of production methods described here. For example, there may be variations in the shape of the indentations, among other things.

Other embodiments are also within the scope of the following claims.

What is claimed is:

1. An electrochemical cell comprising:
   an electrode stack; and
   a housing that is substantially cylindrical in shape and that holds the electrode stack, the housing having an indentation that forms a substantially flat contact area with the electrode stack.

2. The electrochemical cell of claim 1, wherein the indentation is formed on a side of the housing.

3. The electrochemical cell of claim 1, wherein the indentation is deeper at edges of the indentation.

4. The electrochemical cell of claim 1, wherein the indentation comprises at least three areas that are more deeply indented than other areas of the indentation.

5. The electrochemical cell of claim 1, wherein the indentation extends over a majority of a height of the electrode stack.

6. The electrochemical cell of claim 1, wherein the housing comprises two or more indentations, at least one indentation being formed in an upper area of the electrode stack, and at least one indentation being formed in a lower area of the electrode stack.

7. The electrochemical cell of claim 1, wherein the electrode stack comprises at least two electrode layers which are separated by a separator layer.

8. The electrochemical cell of claim 1, wherein:
   the electrochemical cell comprises an aluminium electrolytic capacitor; and
   the electrode stack comprises a capacitor winding having two aluminium layers as electrodes, the two aluminium layers being separated by a separator layer and making contact with an electrolyte.

9. A method of producing an electrochemical cell comprised of an electrode stack and a housing that is substantially cylindrical in shape and that holds the electrode stack, the housing having an indentation that forms a substantially flat contact area with the electrode stack, the method comprising:
   inserting the electrode stack into the housing;
   bringing a die into contact with the housing, the die having a head with at least three contact points that come into contact with the housing; and
   stamping the die onto the housing to form the indentation.

10. The method of claim 9, wherein the die forms singular or linear contacts with the housing to form the indentation.

11. The method of claim 9, wherein a surface of the head of the die has a concave curvature, and edges of the head of the die located between the at least three contact points are curved such that, when the at least three contact points come into contact with the housing, mid-points of the edges are farther from the housing than the at least three contact points.

12. The method of claim 9, wherein a cross-section of the die has a shape of a polygon, the contact points corresponding to corners of the polygon.

13. The method of claim 9, wherein a cross-section of the die has a shape of a rectangle, the contact points corresponding to corners of the rectangle.

14. The method of claim 9, wherein edges of the indentation are deeper than other areas of the indentation.

15. The method of claim 9, wherein the housing is comprised of a ductile material.

16. The method of claim 9, wherein the housing is comprised of metal.

* * * * *